Aug. 27, 1946.  J. D. LINCOLN  2,406,697
JOINT CONSTRUCTION
Filed Dec. 24, 1943  3 Sheets-Sheet 1

INVENTOR.
JOHN D. LINCOLN
BY Orton and Griswold
ATTORNEY

Aug. 27, 1946.   J. D. LINCOLN   2,406,697
JOINT CONSTRUCTION
Filed Dec. 24, 1943   3 Sheets-Sheet 2

INVENTOR.
John D. Lincoln
BY
ATTORNEY

Aug. 27, 1946.   J. D. LINCOLN   2,406,697
JOINT CONSTRUCTION
Filed Dec. 24, 1943   3 Sheets-Sheet 3

INVENTOR.
JOHN D. LINCOLN
BY Alton and Griswold
ATTORNEY

Patented Aug. 27, 1946

2,406,697

UNITED STATES PATENT OFFICE 2,406,697

JOINT CONSTRUCTION

John D. Lincoln, Marion, Va., assignor to Virginia-Lincoln Corporation, Marion, Va., a corporation of Virginia Application December 24, 1943, Serial No. 515,512

6 Claims. (Cl. 154—83)

This invention relates broadly to joints or corner constructions in the production of various containers, vessels or other hollow structures, as well as to the containers, vessels, or other hollow structures having such corner construction, although not so limited. More particularly, the invention relates to processes for the joining of sheet material, such as laminated fibrous sheets to form hollow structures, vessels or containers.

The primary object of the present invention is a container or other hollow vessel in which spaced wall portions are joined or connected together.

Another object of the invention is a joint or corner construction in a hollow vessel having suitable strength and rigidity.

It is also an object of this invention to provide a connecting structure for spaced wall portions having, inherently, the capacity to bond with adjacent wall portions.

A further object of the invention is a composite connecting portion which may be readily formed to the desired configuration in the same operation in which it is bonded to adjacent wall portions or other members.

Yet another object of the invention is a hollow composite structure in which the outer side is substantially absolutely smooth and continuous.

It is also an object of this invention to form an integral dihedral angle of composite material.

In carrying the invention into effect, in its preferred embodiment, adjacent structures, such as solid sheets or laminations, preferably of fibrous material, are joined by mouldable fabric comprising thermoplastic material capable of bonding with laminated or solid fibrous material, for instance plywood, and having the requisite strength for the purpose at hand.

It has heretofore been proposed to form containers out of laminations of plywood, for instance, and fabric, such as canvas or other cloth by moulding the laminated structure to the shape desired. In each instance, however, the curvalinear portions of the structure have comprised a wooden lamination.

It has also been proposed to produce containers and vessels of various sorts from sheets, laminated or integral, of fibrous material, but the corners, in these instances, have been formed by notching or bevelling the edges of the fibrous material to be connected or united and adhering them in contact one with the other.

Heretofore, when it has been sought to join elements in the formation of a hollow structure, the walls, which have been of fibrous material on the order of sheets of wood or wooden laminations, have been subjected to softening and bending in order to form the corners. In the instant invention the corners are preferably comprised of thermoplastic material moulded to the desired shape and united to the fibrous walls on either side.

These and other objects of the invention and the means for their attainment will be more apparent from the following detailed description, taken in connection with the accompanying drawings illustrating one embodiment by which the invention may be realized, and in which.

Figure 6:
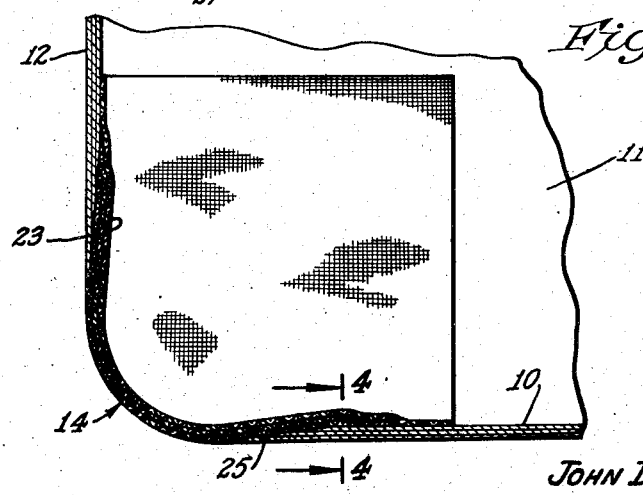
Fig. 6 is an enlarged fragmentary sectional view showing the wall members and corner elements after having been united in the finished corner joint in accordance with this invention.

Referring first to Figure 6, illustrating a fragmentary portion of a hollow structure, the sides of the structure are shown, for the purpose of illustration, as comprised of a plurality of laminations of fibrous material, preferably of wood. Conveniently each side is a laminated sheet commonly known as plywood, although solid wood is also applicable. Fragmentary portions of three sides are shown in Fig. 6, to wit: the bottom 10, a side 11 and an end 12. The adjacent edges of the plywood sides are connected by a corner construction 14 comprised of laminations of woven fabric.

Figure 1:
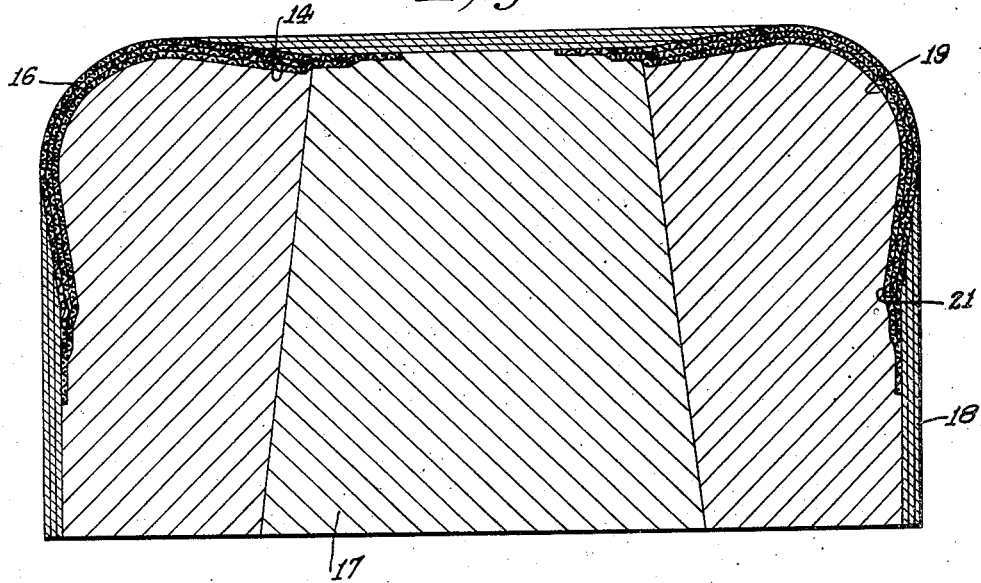
Fig. 1 is a view in transverse section showing a form on which a hollow structure is first formed of separate elements.

In the formation of the hollow structure, and referring to Fig. 1, there is there shown a core or male form member 17 of the shape of, and proportions and dimensions of, the interior surface of the hollow structure to be formed. The form member 17 is conveniently although not necessarily of wood. In the illustrated embodiment, the corners 19 of the matrix are rounded and proximate the corners the matrix may, if found necessary, be recessed slightly as at 21 to receive the end portions 23 of the fabric material which overlap the wall members 10, 11, 12. Several superimposed laminations of sheet material 16 are first laid upon the matrix to form the corner construction, the innermost lamination being preferably longer in all directions than the outer laminations which are progressively shorter in all directions. It will be noted that these fabric laminations are placed only at areas, say the corners where a substantial change in the direction taken by the outer surface of the hollow vessel occurs.

Figure 5:
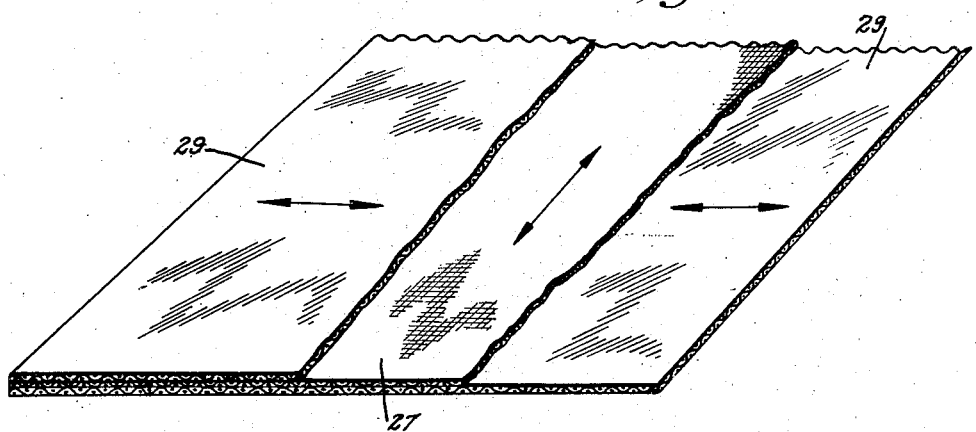
Fig. 5 is a fragmentary view showing the relative disposition of the several layers of thermoplastic fabric to afford strength and rigidity to the joint.

In the illustrated embodiment, laminations of fibrous material, say wood, which are preferably previously united into composite sheet, as plywood, are then placed on the planar sides of the matrix, each lamination being preferably longer (or larger in several directions as the case may be), to progressively overlie the overlapping edges of the fabric. The end portions of the plywood sheet are skived as at 25, so that the edge portions taper from the full thickness to a relatively thin edge. At the corners, the fabric, of which the joining structure is composed, is made up of a plurality of superimposed sheets, as shown in Fig. 5. Certain of the superimposed sheets, as shown, the intermediate sheet, may be woven of an organic fibre, and be say, cotton duck, as indicated at 27, to lend strength to the structure. Others of the superimposed sheets, here shown as the outer sheets, 29, may comprise cloth woven of threads of glass fibre and impregnated with thermoplastic material, preferably of a resin. Obviously the number of sheets and their relative arrangement may be varied to suit conditions. It will be recognized that any woven fabric is extensible in one direction and it is, therefore, proposed in accordance with this invention to superimpose the woven sheets, both fiber glass and canvas or other cloth, so that the stretch of certain of the sheets and preferably alternate sheets extend at an angle to one another, and preferably at right angles, as shown by the arrows in Fig. 5. Thus the resistance to stretch of one sheet opposes the tendency of the adjacent sheet to stretch and the composite structure is resistant to elongation in all directions.

A corner construction comprising three fabric sheets is shown in Fig. 6. Three such superimposed sheets are illustrated in Fig. 5. It may be assumed that the sheet 27 is a woven cloth of the type known as cotton duck and that the sheets 29 on opposite sides thereof are of a cloth commonly known as glass cloth, the warp and weft of which are comprised of strands of a suitable thermoplastic resin. These sheets may be caused to adhere to one another and to the wooden laminations by heat and pressure to form a composite structure such as shown in Fig. 4.

Figure 4:
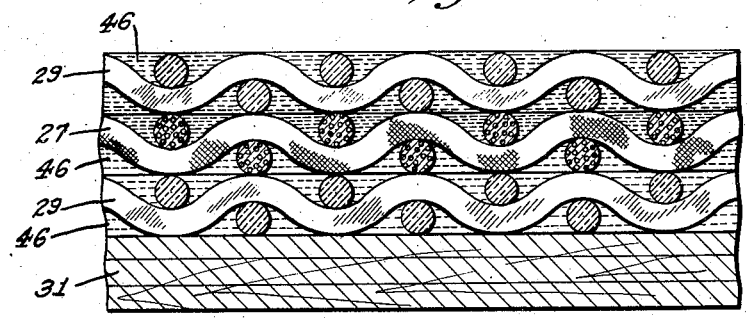
Fig. 4 is a somewhat schematic, fragmentary view showing the manner in which the joints in the composite structure are built up of several layers of superimposed fabric and fibrous sheet material to form a rigid composite joint structure in the finished article.

In Fig. 4 there is shown an enlarged sectional view of a built up fabric wherein the layers adhered to a section of plywood represent, respectively, a lamination of plywood 31, a layer of glass cloth 29, a layer of woven cotton cloth 27, and another layer of glass cloth 29 all of which have been adhered together in a manner to be described and which, on one side, is adhered to the fibrous lamination 31 of, say, plywood by the application of heat and pressure as hereinafter described.

Figure 2:
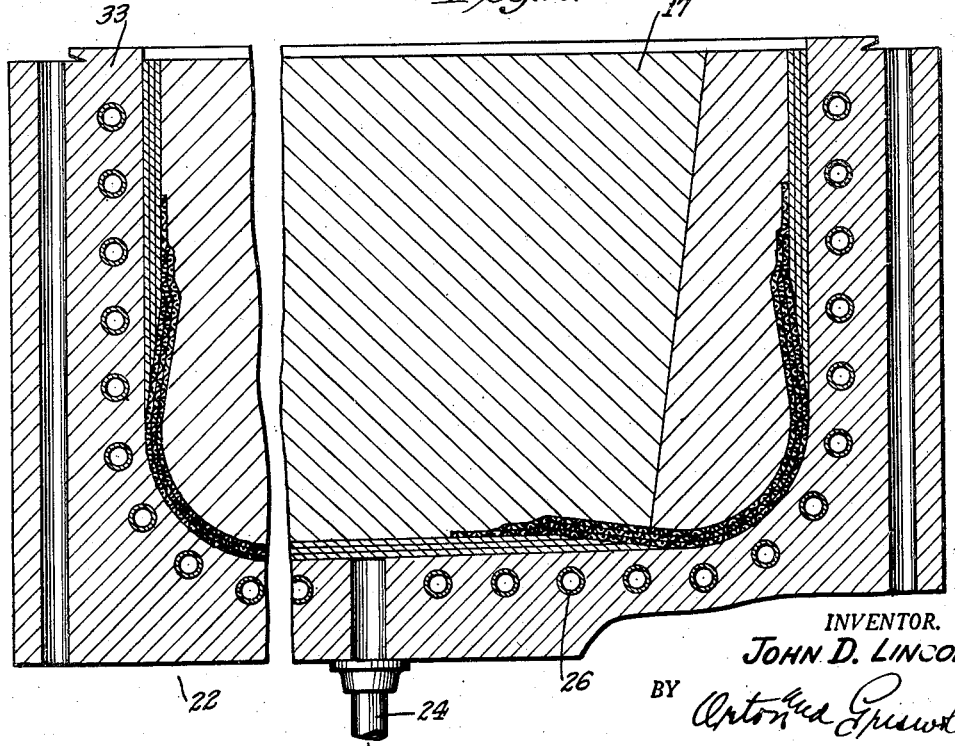
Fig. 2 is a view showing the matrix with the structure to be made integral in accordance with the method of this invention, in place in a mould, and wherein, by the use of heat, component elements of the structure are softened and then solidified into a unitary structure.

The fabric and plywood are placed in the position on the core or form shown in Fig. 1. Conveniently the fabric may be temporarily held in position by adhering small areas of the fabric to the mould as by touching such small areas with a heated iron to cause the resinous material at these points to fuse and adhere to the wooden laminations. The core with the fabric and plywood in place, is then inverted and inserted into the treating or conditioning mould 33 illustrated in Fig. 2. The cavity of this mould has the form of the desired outer surface of the finished structure. This mould is illustrated as formed of wood but, obviously, other materials may be availed of.

Within the wall of the mould and inwardly of the inner surface thereof are disposed a heating coil 35 connected, in a manner not shown, with a source of heated fluid, say steam. Other sources of heat may be availed of. Communicating with the interior of the mould cavity is an exhaust pipe 24 in communicating connection with a source of vacuum, not shown.

Figure 3:
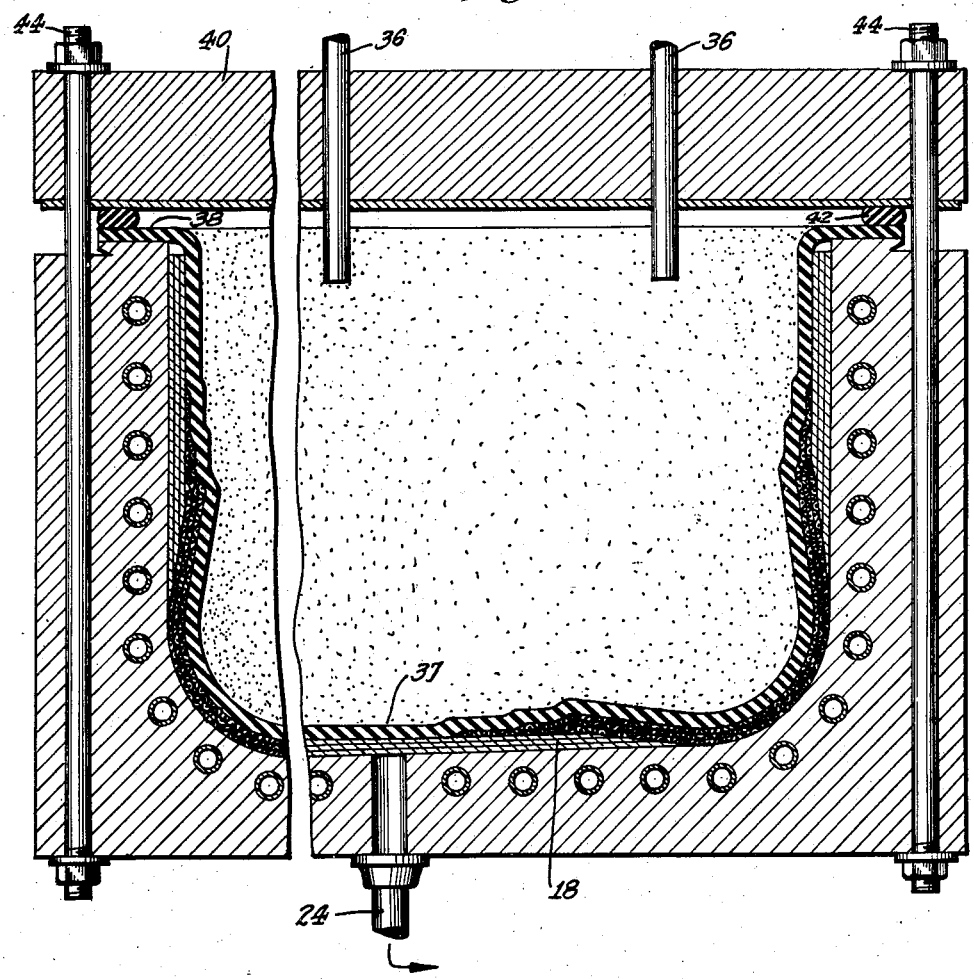
Fig. 3 is a view showing the hollow structure in place in the treating member by which the component elements are united into a rigid structure.

When the composite hollow structure has been inserted in the mould and before the application of heat and suction (vacuum), the core 17 is removed and an impervious flexible blanket 37, conveniently of sheet rubber, (Fig. 3), is placed on the inside surface of the composite structure. The edges of the blanket overlap the edges of the mould, as at 38. A cover member 40 is then superimposed to close the mould cavity. Conveniently, a gasket 42 is interposed between the cover 40 and the peripheral portion 38 of the blanket. The cover 40 is then drawn down to form an airtight joint as by the bolts 44 so that the interior of the mould is hermetically sealed.

The cover is provided with at least one inlet pipe 36 communicating with the mould cavity. A heated fluid medium such as steam, under pressure, is then introduced through the inlet pipe or pipes 36 into the space within the hollow blanket. The temperature of the steam softens the resinous material of the fabric and renders it easily bent to the desired shape and the pressure of the steam forces the blanket against the walls of the laminated hollow structure, and forces the fabric against the walls so that the fabric is distorted into any spaces which may have been present between the ends of the fabric and the overlapping plywood so that the entire outer surface of the hollow structure presents a smooth and continuous surface.

By means of the heating coil 35 the temperature of the mould is raised to that degree necessary to soften the material of the fabric laminations and cause them to adhere to the fibrous laminations and, upon continuation of the heating step, solidifying of the laminated composite structure into a rigid structure is effected as by polymerization of the resinous material. The heat causes the strands of thermoplastic material in the fabric to soften and liquefy to a sufficient degree to fill the interstices of the fabric as shown at 46 (Fig. 4) and, as the heat continues, the liquified material solidifies as by polymerization of the resin and adheres tightly to the strands and the plywood to form a solid rigid structure. The illustration of the interfused laminations in Fig. 4 represent the behavior of the superimposed fabric illustrated in Fig. 6 at the corner portion where the several laminations of woven fibrous material and woven thermoplastic material unite and solidify into a unitary structure in the shape defined by the mould and upon solidification form a rigid composite structure capable of resisting all strains and forces applied thereto in use.

It will thus be seen that hollow structures have been provided, the major portion of the side walls, preferably, having been formed by plywood or other fibrous material while the corners have been readily and conveniently formed of fabric, subsequently caused to be rigid and strong in the same step that unites the fabric to the rigid sheets of fibrous material.

It will be understood that the hollow structures here disclosed and the apparatus and the method by which such apparatus is used in forming the hollow structure is not to be deemed limited to the precise form illustrated in the drawings but various modifications will occur to those skilled in the art in the composition and configuration of the article to be made and the configuration of the so-called mould and its associate parts as well as the composition and structure of the parts to be joined to form the finished structure and no limitation is intended by the phraseology of the foregoing specification or illustrations in the accompanying drawings except as indicated in the appended claims.

What is claimed is:

1. The herein described method of forming composite hollow structures which consists in tapering on at least one side the adjacent edges of spaced wall members of fibrous material, temporarily securing the end portions of a plurality of flexible superimposed fabric sections at least one of which comprises thermoplastic resinous material on a male form member whereof the outer surface is shaped to conform to the inner surface of the hollow structure, inserting the so-covered male form member with the fibrous and fabric sections in situ in a heated female form member whereof the inner surface has the desired outer configuration of the hollow structure to be formed, removing the male form member, lining the fibrous and fabric structure with a flexible blanket and applying heat and pressure to the blanket and thereby to the female form to cause the outer surface of the fabric structure to conform to the female form member and the fabric to soften and then polymerize to form a rigid composite structure.

2. The herein described method of forming composite hollow structures which consists in securing the end portions of a plurality of flexible superimposed fabric sections and sections of thermoplastic material on a male form member whereof the outer surface is shaped to conform to the inner surface of the hollow structure, inserting the male form member with the fibrous and fabric sections in situ in a heated female form member whereof the inner surface has the desired outer configuration of the hollow structure to be formed, removing the male form member, lining the fibrous and fabric structure with a flexible blanket and applying heat and pressure to the blanket and thereby to the female form to cause the outer surface of the fabric structure to conform to the female form member and material of the fabric to soften and then harden to form a rigid composite structure.

3. The herein described method of forming composite hollow structures which consists in tapering on at least one side the adjacent edges of spaced wall members of fibrous material, overlaying the end portions of a plurality of superimposed fabric sections at least one of which comprises thermoplastic material on a male form member whereof the outer surface is shaped to conform to the inner surface of the hollow form, inserting the male form member with the fibrous and fabric sections in situ in a female form member whereof the inner surface has the desired outer configuration of the hollow structure to be formed, removing the male form member, lining the fibrous and fabric structure with a flexible blanket and delivering heated fluid under pressure to the inner surface of the blanket and thereby to the composite structure to cause the outer surface of the fabric structure to conform to the female form member and the fabric to soften and then polymerize to form a rigid composite structure.

4. The herein described method of forming hollow structures which consists in tapering on at least one side the adjacent edges of spaced wall members of fibrous material temporarily securing the end portions of a plurality of superimposed fabric sections at least one of which comprises thermoplastic material on a male form member whereof the outer surface is shaped to conform to the inner surface of the hollow form, inserting the male form member with the fibrous and fabric sections in situ in a female form member whereof the inner surface has the desired outer configuration of the hollow structure to be formed, removing the male form member, lining the fibrous and fabric structure with a flexible blanket and applying steam under pressure to the blanket and thereby to the female form to cause the outer surface of the fabric structure to conform to the female form member and the fabric to soften and then polymerize to form a rigid composite structure.

5. The herein described method of forming a composite hollow structure which consists in preforming a hollow laminated body of overlapping fabric sections comprising polymerizable thermoplastic material on a male form member, inserting the male form member with the overlapping fabric sections in situ into a heated female form member whereof the inner surface has the desired outer configuration of the hollow structure to be formed, removing the male form member, lining the fabric structure with a flexible blanket and applying heat and pressure to the blanket and thereby to the hollow body to cause the outer surface of the fabric structure to conform to the female form member and the fabric to soften and then polymerize to form a rigid composite structure.

6. The herein described method of forming a structure of predetermined shape which consists in preforming a body of fabric comprising polymerizable thermoplastic material on a male form member, disposing the preformed body and its supporting male form member in a female member of the desired configuration of the structure to be formed, removing the male form member, applying a flexible blanket to the exposed surface of the body and applying heat and pressure to the blanket and thereby to the body to soften and then polymerize to form a rigid structure.

JOHN D. LINCOLN.